United States Patent
Southerland et al.

(10) Patent No.: US 11,822,685 B2
(45) Date of Patent: *Nov. 21, 2023

(54) SYSTEM AND METHOD FOR ARTIFACT MANAGEMENT AND REPRESENTATION IN IDENTITY MANAGEMENT SYSTEMS AND USES OF SAME, INCLUDING REPRESENTATION OF EFFECTIVE ACCESS AND APPLICATION OF IDENTITY MANAGEMENT POLICIES

(71) Applicant: SailPoint Technologies, Inc., Wilmington, DE (US)

(72) Inventors: Jeremy James Southerland, Liberty Hill, TX (US); Ryan Allan Pickens, Austin, TX (US)

(73) Assignee: SAILPOINT TECHNOLOGIES, INC., Wilmington, DE (US)

( * ) Notice: Subject to any disclaimer, the term of this patent is extended or adjusted under 35 U.S.C. 154(b) by 166 days.

This patent is subject to a terminal disclaimer.

(21) Appl. No.: 17/140,941

(22) Filed: Jan. 4, 2021

(65) Prior Publication Data
US 2021/0124836 A1 Apr. 29, 2021

Related U.S. Application Data

(63) Continuation of application No. 16/552,230, filed on Aug. 27, 2019, now Pat. No. 10,915,652.

(51) Int. Cl.
*H04L 29/06* (2006.01)
*G06F 21/62* (2013.01)
*H04L 9/40* (2022.01)

(52) U.S. Cl.
CPC ........ *G06F 21/6218* (2013.01); *H04L 63/102* (2013.01)

(58) Field of Classification Search
CPC .... G06F 21/6218; H04L 63/102; H04L 63/20
(Continued)

(56) References Cited

U.S. PATENT DOCUMENTS 6,889,210 B1 * 5/2005 Vainstein ............... H04L 63/08
705/50
7,840,804 B2 11/2010 Oikawa
(Continued)

OTHER PUBLICATIONS

A Model for Credential Based Exception Management in Digital Rights Management Systems, Morin et al., Jul. 2007 (Year: 2007).*
(Continued)

*Primary Examiner* — Jahangir Kabir
(74) *Attorney, Agent, or Firm* — Sprinkle IP Law Group

(57) ABSTRACT

Systems and methods for embodiments of identity management systems and data models used by identity management systems are disclosed. Embodiments of the identity management systems and associated data models as disclosed herein may associate identities with their respective entitlements, while preserving the hierarchy imposed by the source system from which those identities or entitlement were derived, including the hierarchical structure that resulted in the (direct or effective) assignment of such an entitlement, along with the hierarchical nature of the digital assets to which those entitlements pertain. Using embodiments of the disclosed data model embodiments of identity management systems may implement tasks, processes or policies that take advantage of the ability to easily navigate between an identity and its respective entitlements, the management structures that resulted in the entitlement being assigned or the hierarchical relationships between the digital assets corresponding to those entitlements.

21 Claims, 5 Drawing Sheets

(58) Field of Classification Search
USPC .......................................................... 726/28
See application file for complete search history.

(56) References Cited

U.S. PATENT DOCUMENTS

| | | |
|---|---|---|
| 8,429,708 B1 | 4/2013 | Tandon |
| 9,754,119 B1 | 9/2017 | Kilday |
| 10,915,652 B1 | 2/2021 | Southerland |
| 2003/0018971 A1 | 1/2003 | McKenna |
| 2012/0311637 A1 | 12/2012 | Anthru |
| 2014/0129268 A1 | 5/2014 | B'Far |

OTHER PUBLICATIONS

Office Action for U.S. Appl. No. 16/552,230, dated Oct. 21, 2019, 11 pgs.
Office Action for U.S. Appl. No. 16/552,230, dated Jan. 29, 2020, 13 pgs.
Notice of Allowance for U.S. Appl. No. 16/552,230, dated Oct. 29, 2020, 8 pgs.

* cited by examiner

SYSTEM AND METHOD FOR ARTIFACT MANAGEMENT AND REPRESENTATION IN IDENTITY MANAGEMENT SYSTEMS AND USES OF SAME, INCLUDING REPRESENTATION OF EFFECTIVE ACCESS AND APPLICATION OF IDENTITY MANAGEMENT POLICIES

RELATED APPLICATIONS

This application is a continuation of, and claims a benefit of priority under 35 U.S.C. 120 of, U.S. patent application Ser. No. 16/552,230 filed Aug. 27, 2019, issued as U.S. Pat. No. 10,915,652, entitled "SYSTEM AND METHOD FOR ARTIFACT MANAGEMENT AND REPRESENTATION IN IDENTITY MANAGEMENT SYSTEMS AND USES OF SAME, INCLUDING REPRESENTATION OF EFFECTIVE ACCESS AND APPLICATION OF IDENTITY MANAGEMENT POLICIES," which is hereby incorporated herein for all purposes

TECHNICAL FIELD

This disclosure relates generally to computer security. In particular, this disclosure relates to identity management and governance in a distributed and networked computing environment. Even more specifically, this disclosure relates to enhancing computer security in a distributed networked computing environment through improved representation of artifacts in identity management systems and the uses for such representations, including improved representation of effective access associated with artifacts within such distributed and networked computer environments and improved application of policies based on such representation, including separation of duties policies.

BACKGROUND

Acts of fraud, data tampering, privacy breaches, theft of intellectual property, and exposure of trade secrets have become front page news in today's business world. The security access risk posed by insiders—persons who are granted access to information assets—is growing in magnitude, with the power to damage brand reputation, lower profits, and erode market capitalization.

Identity Management (IM), also known as Identity and Access Management (IAM) or Identity Governance (IG), is, the field of computer security concerned with the enablement and enforcement of policies and measures which allow and ensure that the right individuals access the right resources at the right times and for the right reasons. It addresses the need to ensure appropriate access to resources across increasingly heterogeneous technology environments and to meet increasingly rigorous compliance requirements. Escalating security and privacy concerns are driving governance, access risk management, and compliance to the forefront of identity management. To effectively meet the requirements and desires imposed upon enterprises or other organizations (used herein interchangeably) for identity management, these enterprises may be required to prove that they have strong and consistent controls over who has access to critical applications and data. And, in response to regulatory requirements and the growing security access risk, most enterprises have implemented some form of user access or identity governance.

Yet many enterprises still struggle with how to focus compliance efforts to address actual risk in what usually is a complex, distributed networked computing environment. Decisions about which access entitlements are desirable to grant a particular user are typically based on the roles that the user plays within the organization. In large organizations, granting and maintaining user access entitlements is a difficult and complex process, involving decisions regarding whether to grant entitlements to thousands of users and hundreds of different applications and databases. This complexity can be exacerbated by high employee turnover, reorganizations, and reconfigurations of the various accessible systems and resources.

Organizations that are unable to focus their identity compliance efforts on areas of greatest access risk can waste time, labor, and other resources applying compliance monitoring and controls across the board to all users and all applications. Furthermore, with no means to establish a baseline measurement of identity compliance, organizations have no way to quantify improvements over time and demonstrate that their identity controls are working and effectively reducing access risk.

Information Technology (IT) personnel of large organizations often feel that their greatest security risks stemmed from "insider threats," as opposed to external attacks. The access risks posed by insiders range from careless negligence to more serious cases of financial fraud, corporate espionage, or malicious sabotage of systems and data. Organizations that fail to proactively manage user access can face regulatory fines, litigation penalties, public relations fees, loss of customer trust, and ultimately lost revenue and lower stock valuation. To minimize the security risk posed by insiders (and outsiders), business entities and institutions alike often establish access or other governance policies that eliminate or at least reduce such access risks and implement proactive oversight and management of user access entitlements to ensure compliance with defined policies and other good practices.

One of the main goals of IM, then, is to help users identify and mitigate risks associated with access management. As IM is the discipline that ensures compliance with defined policies by aggregating, visualizing, and managing users and their access, implementations of IM systems may enable the automation of certain process within enterprises of organizations, including for example, provisioning, certifications, access reviews, and Separation of Duties (SOD) processes. Typical identity and access information available from IM solutions may utilize simple context to inform certain decision making processes, however additional, more complex and specific, context may be desirable from a variety of perspectives, including managers, owners, IT or security/regulatory departments, or others. Without such complex contextual data information management systems may suffer from low workflow efficiency and lower security.

A microcosm of these problems occurs with respect to the access entitlements granted within an enterprise or other organization. Specifically, access to digital assets within an organization is typically granted in one of two ways: direct or effective. When access is granted directly it is assigned or granted directly to a user. In other words, an access right or entitlement is associated with the user herself. For smaller organizations this may be typically how the assignment of access entitlements is accomplished. Such direct assignment does not, however, scale well to large enterprises, as direct management of such access entitlements for each user across each of the access entitlements within a large enterprise is untenable.

To help ameliorate this situation, often time users are granted effective access. Effective access is access that is assigned to a management structure and is inherited through an assignment of the user to the management structure or from the relationships of the digital assets themselves. Specifically, users may be assigned or associated with groups, roles, folders, subfolders or other types of management collections or entities (collectively groups herein) and access rights assigned to a group. In this manner, each user within the group is effectively assigned the access rights assigned to each group to whom that user belongs. As another example, a user may be granted access rights to a folder and be granted access rights to a subfolder of that parent folder. Certain systems or applications such as Active Directory may assist in the creation of management of these groupings and assignments. This indirect or effective access is thus traditionally implemented with respect to a logical structure, like an Active Directory group, because this makes it efficient to assign a group to users and an access entitlement to a group, versus assigning the underlying access entitlement individually to each user. Effective access also usually allows inheritance of access entitlements based on nested associations of groups. In other words, if a user is associated with a first group that is a subgroup of a second group, the user may indirectly (or effectively) be assigned the access entitlements assigned to both the second group and the first group. Thus, effective access can be multiple levels deep with complex inheritance structures. It will be realized that this added abstraction layer makes it difficult to understand what access a user actually has because of the depth and complexity of the underlying inheritance within such groups.

Thus, from an IM perspective such access rights and users must be managed (e.g., such as for the aforementioned IM process of provisioning, certifications, access reviews, or application of SOD policies), regardless of whether these access rights stem from direct or effective access. The management of effective access is however, not straightforward. This difficulty stems in no small part from the highly complex and convoluted nature of management structures within a modern day enterprise, along with the sheer size of those enterprises. Thus, while manual correlation and verification of effective access and manual application of management processes (such as application of SOD policies or the like) is possible, such a solution is not scalable, leading to potential security risks. Because of the permutations of access entitlement and users, and the manners in which those users may be granted effective access (including the complexity and prevalence of a large number of management structures), these solutions do not allow for a timely or complete evaluation of effective access, especially in instances when IM process, such as application of SOD policies, required a determination of undesirable combinations of these access rights.

What is desired therefore, are improved systems and methods for identity governance that provide an infrastructure for detailed and relevant contextual identity governance information, including the representation or modeling of effective access granted in an enterprise and the use of such detailed and relevant contextual identity governance information in identity management process such as the application of SOD policies or the like.

SUMMARY

As mentioned, it is usually required for identity management solutions to deliver the capability for the creation, ongoing management, display, and distribution of detailed and relevant contextual identity governance information for an enterprise. This desire is prevalent at least because, within the IG space today, the best approaches to providing any sort of useful context are manual, ad hoc, and error prone (e.g., not repeatable with consistent outcomes). These limited approaches are not consistent, efficient, timely, or scalable.

Specifically, within an enterprise there may be many systems that are used to govern access or impose access controls on users, or otherwise secure, monitor or control access to entitlements within an enterprise. Such systems may work in a hierarchical or associative manner. Users may be grouped into groups, roles or other types of management collections or entities (collectively groups herein) and access rights assigned to a group. Thus, certain systems or applications within an enterprise, such as Active Directory, may assist in the creation of management of these groupings and assignments. In this manner, each user within the group is effectively assigned the access rights assigned to each group to whom that user belongs. Moreover, these types of systems may allow management entities (e.g., groups or the like) to include one or more other management entities such that these management entities may be nested. In this manner, access entitlements may be inherited based on these nested associations of groups. For example, Active Directory allows hierarchies of groups and users to be defined and used to govern or manage privileged access.

One particular type of these management tools is referred to as a Privileged Access Management (PAM) system. These PAM systems help organizations provide secure privileged access to critical assets and meet compliance requirements by managing and monitoring privileged accounts and access. Privileged accounts are, for example, "root" or "Administrator" accounts on a server, the root username/ password for an Amazon Web Services account, or other similar "superuser" accounts, as opposed to non-superuser (normal user) accounts. PAM tools offer features that, for example, enable enterprises to discover privileged accounts on systems, devices and applications for subsequent management; automatically randomize, manage and vault passwords and other credentials for administrative, service and application accounts, control access to privileged accounts, including shared and "firecall" (emergency access) accounts, and isolate, monitor, record and audit privileged access sessions, commands and actions.

Identity management systems as disclosed may obtain data on identity management artifacts (e.g., such as an identity, entitlement, role, group, event, access profile or account activity) such that these artifacts may be associated and managed accordingly. These artifacts may be imported or determined from data obtained from a set of source systems within an enterprise. For example, certain identity management systems such as SailPoint's IdentityIQ File Access Manager (FAM) may govern access to data by identifying and monitoring access to such sensitive data. Embodiments of such IM systems may allow the management of access rights and users for various IM tasks, including the provisioning of entitlements, certifications, access reviews, or application of SOD policies. Many of these tasks revolve around entitlements granted to identities (e.g., users or groups thereof) for a digital asset within an enterprise. For example, SOD policies may define one or more entitlements that may not be granted together, must be granted in tandem, that may or may not be granted to an identity with certain attributes or other conditions for the granting of one or entitlements. The evaluation of such SOD policies in an IM system therefore requires that the IM system properly model the access entitlements granted an identity.

This modeling is not easily accomplished and may severely impact the performance of IM systems in performing IM tasks. As discussed, these issues stem in no small part from the fact that access to digital assets within an organization may be granted through source systems either in a direct or effective manner. Moreover, the digital assets themselves may be organized in a hierarchical structure (e.g., directories, folders, subfolders, etc.). IM systems may thus model direct access and effective access substantially identically by "flattening out" the hierarchy that resulted in any effectively assigned entitlements (e.g., inherited through assignment to a group or an entitlement granted as a result of an entitlement to a parent asset (e.g., folder, etc.)), such that modeling of these access entitlement with respect to the identity models the access entitlement as directly assigned to the identity (e.g., an access entitlement directly links the identity with the artifact for which the identity has the entitlement). So, for example, if an identity has been granted access to a parent folder, and thus been granted access to subfolder, the entitlement to each parent folder and each subfolder may be assigned directly to the identity. Similarly, if an identity has been assigned to a group, and thus been granted access to a folder, the entitlement to access that folder may be assigned directly to the identity (e.g., without reference to the group). In this way the visualization, presentation and management of all access entitlement can be accomplished by an IM system in the same manner, as they are all modeled as being at the same level (e.g., directly assigned to the identity) and do not reference any intermediary artifacts or assets.

While the direct assignment of entitlements to identities allows the management of such entitlements and the implementation of IM tasks with respect to such identity and entitlements, in a straightforward manner, as all entitlements may be directly evaluated from the identity; such a representation breaks the hierarchical structure maintained by the source systems and removes any ability to derive how such entitlements were inherited through such a hierarchy. This situation is less than desirable from an identity governance perspective. In particular, it is useful for the structures utilized to govern and present IM data to mirror or approximate those used by the source systems and business processes of an enterprise. In that way, the same context a user of the enterprise is familiar with may also inform IM processes of that enterprise. If this context is missing, the IG processes of the enterprise may be compromised. Moreover, it may be desired to implement IM tasks or processes that take into account such hierarchical structures, including for instance, how entitlements have been assigned or derived for an identity. As but one example, it may be desirable to implement, evaluate and enforce SOD policies that take into account effective versus direct access, or different entitlements based on effective access, etc.

It would therefore be desirable to maintain the hierarchical structure of source systems with respect to the modeling of entitlements and identities in an IM system. From a technical perspective, however, it is undesirable to directly mirror or ape the model of hierarchical structures of the source system themselves, as these structures are not universal across source systems and reliance on such proprietary models may lead to a dependency on a single model or, conversely, the need to implement a data model for each source system from which these identities and entitlements are obtained or derived.

Accordingly, embodiment as disclosed herein may utilize embodiments of a data model that assigns entitlements directly to an identity, regardless of whether those entitlements are granted to an identity directly or effectively. Additionally, embodiments of the data model may preserve any hierarchical structure from which effective entitlements are derived by maintaining attributes on each effective entitlement, where an attribute on an entitlement can specify one or more intermediary identity management constructs (e.g., group) through which the entitlement was effectively assigned. In this manner, the attributes may model the "how" of the entitlement, in other words the attributes may reflect the identity management artifacts (including, in some embodiment, the path or hierarchy of these artifacts) that resulted in the identity being granted the entitlement. Moreover, embodiments may preserve the hierarchy among the digital assets relating to the entitlements themselves by maintaining pointers between the entitlements that reflect the hierarchy (e.g., parent or child relationships) of the related digital assets corresponding to those entitlements.

Using such a data model then, embodiments of IM systems may implement tasks, processes or policies that take advantage of the ability to easily navigate between an identity and its respective entitlements, the identity management artifacts that resulted in the entitlement being assigned or the hierarchical relationships between the digital assets corresponding to those entitlements. In this way, increasingly complex tasks, processes and policies may be defined and implemented in an IM system. Specifically, for example, SOD policies that take into account the artifacts and the associated assignment of entitlements (including both direct and effective access) and the hierarchical relationships between digital assets may now be created, evaluated and enforced.

Moreover, such complex tasks, processes and policies may be defined and implemented without significantly increasing the time to accomplish such tasks or evaluate an increasing number of assigned entitlements. For example, when evaluating an SOD policy including entitlements against an identity, in the case of evaluation of that policy against an identity using a data model where all entitlements are assigned directly to the identity without anything more, each of the directly assigned entitlements may need to be evaluated, regardless of how those entitlements were assigned or the relationships between the digital assets corresponding to those entitlements. Depending on the nature and structure of the entitlements or digital assets this may be an exponential order operation. The evaluation of similar SOD polices using a data model that maintains attributes pertaining to intermediary identity management constructs that resulted in the entitlement being assigned, or that maintains relationships between the entitlements reflective of the relationships of the underlying digital assets, may reduce the evaluation of such SOD policies with respect to an identity to a logarithmic, or even linear, order operation.

Accordingly, embodiments as disclosed may offer the technological improvement of reducing the computational burden and memory requirements of systems implementing these embodiments through the improved data models and structures implemented by such embodiments. As such, embodiments may improve the performance and responsiveness of identity management systems that utilize embodiments of these types of data models by reducing the computation time and processor cycles required to implement or evaluate tasks, processes or policies in association with such data models while simultaneously reducing memory usage or other memory requirements.

In one embodiment, an identity management system may include a connector or other process for obtaining identity management data from one or more source systems in a distributed enterprise computing environment, the identity management data comprising data on a set of identity management artifacts utilized in identity management in the distributed enterprise computing environment. The identity management system can evaluate the identity management data to determine a first entitlement for a first digital asset of the source system and a second entitlement for a second digital asset of the source system, wherein the first entitlement is directly assigned to a user and the second entitlement is indirectly assigned to a user through a first management structure maintained by the source system whereby the user is granted the second entitlement by virtue of the user's assignment to the first management structure by the source system.

The user, the first entitlement for the first digital asset, and the second entitlement for the second digital asset can be represented at the identity management system in a data model, where the data model includes an identity cube represents the user, the first entitlement for the first digital asset, and the second entitlement for the second digital asset. In the data model the first entitlement for the first digital asset is directly linked to the identity cube representing the user, the second entitlement for the second digital asset is directly linked to the identity cube representing the user, and the second entitlement includes a first inheritance attribute. The value of the first inheritance attribute can be an identifier of the first management structure maintained by the source system to which the user is assigned by the source system and through which the user is granted the second entitlement to the second digital asset.

In some embodiments, evaluating the identity management data comprises determining a third entitlement for a third digital asset of the source system and the third digital asset is a child of the second digital asset, and the data model includes a hierarchical link linking the third entitlement to the second entitlement and indicating the third digital asset is a child of the second digital asset.

In particular embodiments, the third entitlement includes a second inheritance attribute, wherein the value of the second inheritance attribute is the identifier of the first management structure maintained by the source system to which the user is assigned by the source system and through which the user is granted the second entitlement to the second digital asset. As an example, in one embodiment, the second digital asset is a folder and the third digital asset is a subfolder of the folder.

In one embodiment, the source system can be an Active Directory system and the first management structure is a group.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE FIGURES

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

DETAILED DESCRIPTION

Figure 1:
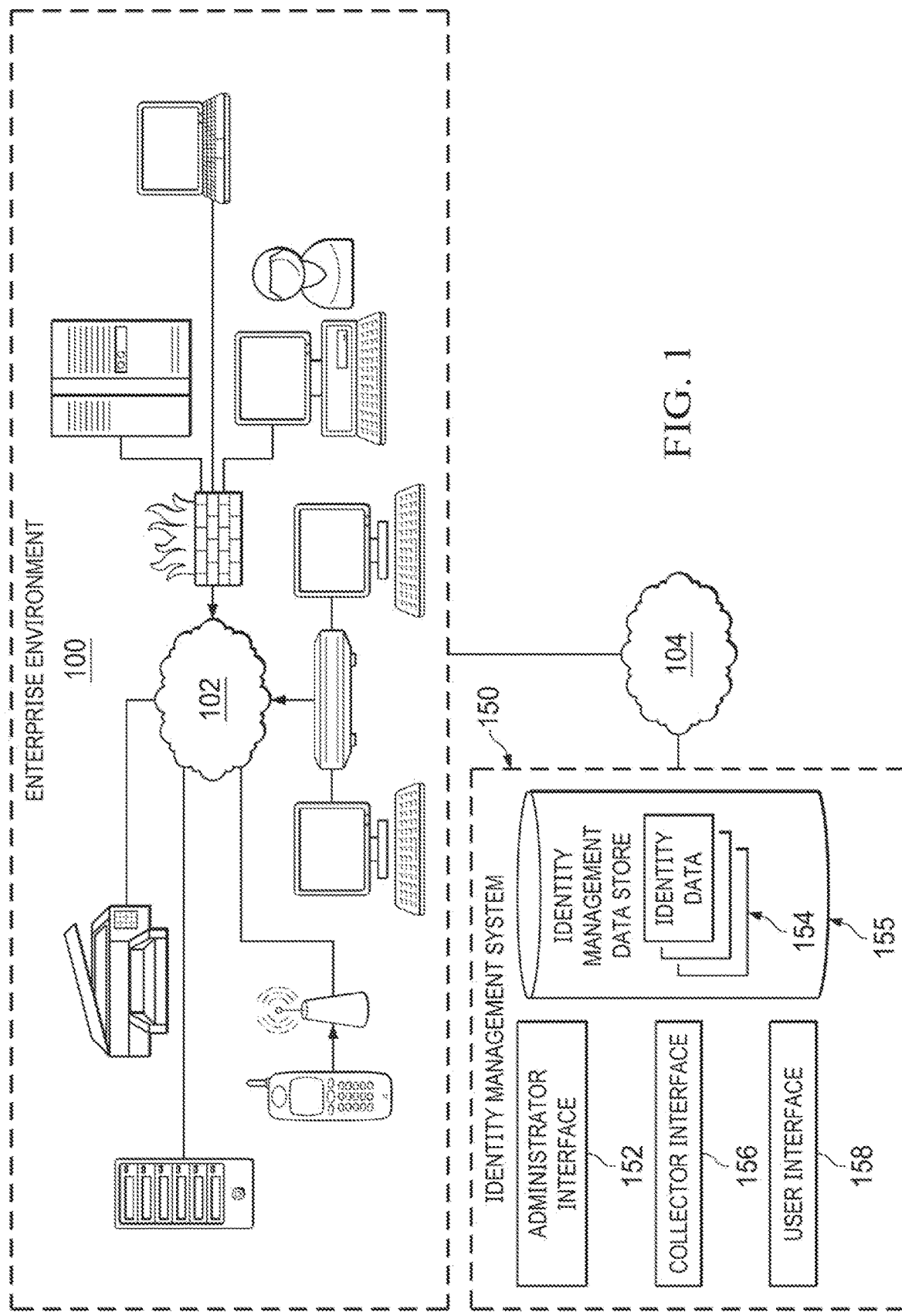
FIG. 1 is a block diagram of a distributed networked computer environment including one embodiment of an identity management system.

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Before delving into more detail regarding the specific embodiments disclosed herein, some context may be helpful. In response to regulatory requirements and security access risks and concerns, most enterprises have implemented some form of computer security or access controls. To assist in implementing security measures and access controls in an enterprise environment, many of these enterprises have implemented Identity Management in association with their distributed networked computer environments. Identity Management solutions allow the definition of particular identity management artifacts (including but not limited to, an identity, entitlement, application, account, role, event, policy, group, permission, user, owner, source, configuration, organization, violation, governance group, access profile or account activity) such that these artifacts may be associated and managed accordingly. For example, an identity may be almost physical or virtual thing, place, person or other item that an enterprise would like to define. Identities can therefore be, for example, certain capacities (e.g., manager, engineer, team leader, etc.), titles (e.g., Chief Technology Officer), groups (development, testing, accounting, etc.), processes (e.g., nightly back-up process), physical locations (e.g., cafeteria, conference room), individual users or humans (e.g., John Locke) or almost any other physical or virtual thing, place, person or other item.

To continue with these example of how these identity governance artifacts may be used, each of these identities may therefore be assigned zero or more entitlements with respect to the distributed networked computer environments. An entitlement may be the ability to perform or access a digital asset or function within the distributed networked computer environments, including, for example, accessing computing systems, applications, file systems, particular data or data items, networks, subnetworks or network locations, etc. To facilitate the assignment of these entitlements, enterprises may also be provided with the ability to define roles or other identity management artifacts within the context of their Identity Management solution. A role within the context of Identity Management may be a collection of entitlements. These roles may be assigned a name or identifiers (e.g., manager, engineer, team leader) by an enterprise that designate the type of user or identity that should be assigned such a role. By assigning a role to an identity in the Identity Management context, the identity may be assigned the corresponding collection of entitlements associated with the assigned role. Accordingly, by defining these roles enterprises may define a "gold standard" of what they desire their identity governance to look like.

Thus, by managing the identity management artifacts using an identity management system, identity governance may be facilitated. For example, by managing the artifacts (e.g., identity or identities, roles, entitlements, etc.) to which users within the enterprise computing environment are assigned, the entitlements or roles to which a user may be assigned (e.g., the functions or access which a user may be allowed) may be controlled. Furthermore, by defining other identity management artifacts, such as more granular access permissions, identity management events or activity may also be determined and evaluated to assess security risk or compliance with identity management policies or rules.

One of the main goals of IM, then, is to help users identify and mitigate risks associated with access management. As IM is the discipline that ensures compliance with defined policies by aggregating, visualizing, and managing users and their access, implementations of IM systems may enable the automation of certain process within enterprises of organizations, including for example, provisioning, certifications, access reviews, and SOD processes. Typical identity and access information available from IM solutions may utilize simple context to inform certain decision making processes, however additional, more complex and specific, context may be desirable from a variety of perspectives, including managers, owners, IT or security/regulatory departments, or others. Without such complex contextual data information management systems may suffer from low workflow efficiency and lower security.

It would therefore by desirable for identity management solutions to offer the capability for the provisioning of detailed and relevant contextual identity governance information for an enterprise. This desire is prevalent at least because within the IG space today, the best approaches to providing any sort of useful context are manual, ad hoc, and error prone (e.g., not repeatable with consistent outcomes). As discussed, a manifestation of these problems occurs with respect to the access entitlements granted within an enterprise or other organization. Specifically, access to digital assets within an organization is typically granted in one of two ways: direct or effective. Effective access is access that is assigned to a management structure and is inherited through an assignment of the user to the management structure or from the relationships of the digital assets themselves. Certain systems or applications such as Active Directory may assist in the creation of management of these groupings and assignments. This indirect or effective access is thus traditionally implemented with respect to a logical structure, like an Active Directory group, because this makes it efficient to assign a group to users and an access entitlement to a group, versus assigning the underlying access entitlement individually to each user.

Thus, from an IM perspective such access rights and users must be managed (e.g., such as for the aforementioned IM process of provisioning, certifications, access reviews, or application of SOD policies), regardless of whether these access rights stem from direct or effective access. Specifically, it may be desired to efficiently implement SOD policies that take into account the hierarchal nature of management structures and the digital assets themselves, including the associated assignment of entitlements (both direct and effective access).

Embodiments of an identity management system as disclosed herein may thus utilize embodiments of a data model that associates identities with their respective entitlements, while preserving the hierarchy imposed by the source system from which those identities or entitlement were derived, including the hierarchical structure that resulted in the (direct or effective) assignment of such an entitlement along with the hierarchical nature of the digital assets to which those entitlements pertain.

In particular, identity management systems as disclosed may obtain data on identity management artifacts or related digital assets (e.g., such as an identity, entitlement, group, role, event, access profile, digital asset or account activity) such that these artifacts may be associated and managed accordingly. These artifacts may be imported or determined from data obtained from a source system within an enterprise. During, or subsequent to, the import process entitlements may be assigned to an identity. Additionally, it can be determined from the data obtained from the source system how such entitlements were assigned to the user (e.g., what, if any, intermediary artifacts or management constructs through which the identity was granted an entitlement). The hierarchy of the digital assets associated with those entitlements may also be obtained from the source system. The identity and entitlements can then be associated at the identity management system in an embodiment of a data model where the identity is associated with its respective entitlements and the hierarchy imposed by the source system from which those identities or entitlement were derived (including the hierarchical structure that resulted in the (direct or effective) assignment of such an entitlement) is preserved, along with the hierarchical nature of the digital assets to which those entitlements pertain.

In particular, embodiments of the data model may maintain entitlements assigned directly to an identity, regardless of whether those entitlements are granted to an identity directly or effectively. Additionally, embodiments of the data model may preserve any hierarchical structure from which effective entitlements are derived by maintaining attributes on each effective entitlement, where an attribute on an entitlement can specify one or more intermediary identity management constructs (e.g., group) through which the entitlement was effectively assigned. In this manner, the attributes may model the "how" of the entitlement, in other words the attributes may reflect the identity management artifacts (including, in some embodiment, the path or hierarchy of these artifacts) that resulted in the identity being granted the entitlement. Moreover, embodiments may preserve the hierarchy among the digital assets relating to the entitlements themselves by maintaining pointers between the entitlements that reflect the hierarchy (e.g., parent or child relationships) of the related digital assets corresponding to those entitlements.

Using such a data model then, embodiments of IM systems may implement tasks, processes or policies that take advantage of the ability to easily navigate between an identity and its respective entitlements, the identity management artifacts that resulted in the entitlement being assigned or the hierarchical relationships between the digital assets corresponding to those entitlements. In this way, increasingly complex tasks, processes and policies may be defined and implemented in an IM system. Specifically, for example, SOD policies that take into account the artifacts and the associated assignment of entitlements (including both direct and effective access) and the hierarchical relationships between digital assets may now be created, evaluated and enforced.

Turning then to FIG. 1, then, a distributed networked computer environment including one embodiment of such an identity management system is depicted. Here, the networked computer environment may include an enterprise computing environment 100. Enterprise environment 100 includes a number of computing devices or applications that may be coupled over a computer network 102 or combination of computer networks, such as the Internet, an intranet, an internet, a Wide Area Network (WAN), a Local Area Network (LAN), a cellular network, a wireless or wired network, or another type of network. Enterprise environment 100 may thus include a number of resources, various resource groups and users associated with an enterprise (for purposes of this disclosure any for profit or non-profit entity or organization). Users may have various roles, job functions, responsibilities, etc. to perform within various processes or tasks associated with enterprise environment 100. Users can include employees, supervisors, managers, IT personnel, vendors, suppliers, customers, robotic or application based users, etc. associated with enterprise 100.

Users may access resources of the enterprise environment 100 to perform functions associated with their jobs, obtain information about enterprise 100 and its products, services, and resources, enter or manipulate information regarding the same, monitor activity in enterprise 100, order supplies and services for enterprise 100, manage inventory, generate financial analyses and reports, or generally to perform any task, activity or process related to the enterprise 100. Thus, to accomplish their responsibilities, users may have entitlements to access resources (e.g., digital assets) of the enterprise environment 100. These entitlements may give rise to risk of negligent or malicious use of resources.

Specifically, to accomplish different functions, different users may have differing access entitlements to differing resources. Some access entitlements may allow particular users to obtain, enter, manipulate, etc. information in resources which may be relatively innocuous. Some access entitlements may allow particular users to manipulate information in resources of the enterprise 100 which might be relatively sensitive. Some sensitive information can include human resource files, financial records, marketing plans, intellectual property files, etc. Access to sensitive information can allow negligent or malicious activities to harm the enterprise itself. Access risks can thus result from a user having entitlements with which the user can access resources that the particular user should not have access to; gain access to another user's entitlements or for other reasons. Access risks can also arise from roles or groups in enterprise environment 100 which may shift, change, evolve, etc. leaving entitlements non optimally distributed among various users.

To assist in managing the artifacts (e.g., identity, entitlement, roles, etc.) assigned to various users and more generally in managing and assessing access risks in enterprise environment 100, an identity management system 150 may be employed. Such an identity management system 150 may allow an administrative or other type of user (or the identity management system 150 itself) to define one or more identity management artifacts such as an identity, entitlement, group, role, event, access profile or account activity, and associate these defined identity management artifacts using, for example, an administrator interface 152. For example, defined identities may be associated with entitlements, groups or roles. The assignment may occur, for example, by directly assigning an entitlement to an identity, or by assigning a group or role to an identity whereby the collection of entitlements comprising the role are thus associated with the identity. Examples of such identity management systems are SailPoint's IdentityIQ and IdentityNow products. Note here, that while the identity management system 150 has been depicted in the diagram as separate and distinct from the enterprise environment 100 and coupled to enterprise environment 100 over a computer network 104 (which may the same as, or different than, network 102), it will be realized that such an identity management system 150 may be deployed as part of the enterprise environment 100, remotely from the enterprise environment, as a cloud based application or set of services, or in another configuration.

It may be helpful to illustrate some examples of identity management artifacts and their usage. As one example, an identity may thus be almost physical or virtual thing, place, person or other item that an enterprise would like to define. Thus, an identity may be an individual or group of users or humans, employees, a virtual entity like a sensor or a robot, an account and may include capacity, title, groups, processes, physical locations, or almost any other physical or virtual thing, place, person or other item. In one embodiment, an Identity may be an authoritative account that includes a first name, a last name and an email address. As another example, an entitlement may be the ability to perform or access a resource or function within the distributed networked enterprise computer environment 100, including, for example, accessing computing systems, applications, files, file systems (or portions thereof), physical locations, particular data or data items, networks, subnetworks or network locations, etc. Entitlements may also define the actions a user can take with respect to that access or resource (e.g., digital asset). Each of these identities may therefore be assigned zero or more entitlements with respect to the distributed networked computer environments.

Another example of an identity management artifact may be a role. Roles may be used to facilitate the assignment of these entitlements. Thus, enterprises may also be provided with the ability to define roles through the identity management system 150. A role within the context of the identity management system 150 may be a collection of entitlements, or access profiles, that may span different source systems. These roles may be assigned a name or identifiers (e.g., manager, engineer, team leader) by an enterprise that designate the type of user or identity that should be assigned such a role. By assigning a role to an identity or group of identities using the identity management system 150, the identity may be assigned the corresponding collection of entitlements or access items associated with the assigned role. Similarly, enterprises may also be provided with the ability to define access profiles. An access profile may be a set of entitlements that represent a level of logical access (e.g., user, guest, administrator, etc.) to a source or applications.

Connectors 156 of the identity management system 150 may thus request or otherwise obtain data from various touchpoint (or source) systems within enterprise environment 100 to obtain identity management data 154. These source systems may include, for example Active Directory systems, Java Database Connectors within the enterprise 100, Microsoft SQL servers, Azure Active Directory servers, OpenLDAP servers, Oracle Databases, SalesForce applications, ServiceNow applications, SAP applications or Google GSuite.

The identity management system 150 can store identity management data 154 in an identity management data store 155. This identity management data store 155 may be, for example, a relational data store, including SQL based data stores such as a MySQL database or the like. The identity management data 154 stored may include a set entries, each entry corresponding to an identity management artifact as discussed. For example, the identity management data 154 may include entries on an identity (e.g., alphanumerical identifiers for identities) as defined and managed by the identity management system, a list or vector of entitlements, roles or access profiles assigned to that identity by the identity management system or other types of artifacts. A time stamp at which the identity management data was collected (e.g., from a source system) may be associated with the data for a particular artifact. Other data could also be associated with each artifact, including data that may be provided from other systems such as a title, location or department associated with the identity. In one embodiment, the identity management data 154 for an artifact (e.g., identity) can be stored in a management entity of "cube" where all identity management data 154 associated with a particular artifact (e.g., for an identity all of their accounts from all data sources, and all attributes and entitlements of those accounts) may be associated. All such management entities comprising a collection of data about an identity artifact may also be referred to herein as an "Identity Cube" without loss of generality.

As another example, the identity management data 154 may also include entries corresponding to entitlements, groups or roles, where each entry for a group or role may include the role identifier (e.g., alphanumerical identifier or name for the role) and a list or vector of the entitlements associated with each role. Other data could also be associated with each group or role, such as a title, location or department associated with the role. Moreover, the identity management data 154 may also include event data collected from various systems within the enterprise environment 100 that is associated with the identities defined in the identity management data 154 through the evaluation or analysis of these events or other data in an identity management context. A user may interact with the identity management system 150 through a user interface 158 to access or manipulate data on identities, roles, entitlements, events or generally perform identity management with respect to enterprise environment 100.

As referenced previously, certain of these systems, such as Active Directory or other directory services or file system managers, may be used to authenticate users, structure resources (e.g., digital assets) of the enterprise 100 and govern users' accesses to those resources. These systems may govern access in one of two ways: direct or effective. When access is granted directly it is assigned or granted directly to a user. In other words, an access right or entitlement to a resource (e.g., digital asset) is associated with the user herself in the source system. Effective access is access that is assigned by the source system to a management structure, object or identity management artifact (used interchangeably herein) maintained by the source system (e.g., such as groups in Active Directory) and is inherited by a user through an assignment of the user to the management structure or from the relationships of the resources (e.g., digital assets) themselves. For example, users may be assigned to groups and access rights assigned to a group. In this manner, each user within the group is effectively assigned the access rights assigned to each group to whom that user belongs.

Moreover, the digital assets themselves may be organized in a hierarchical structure (e.g., directories, folders, subfolders, etc.). Thus, as another example, a user may be granted access rights to a folder and be granted access rights to a subfolder of that parent folder. This indirect or effective access is thus traditionally implemented with respect to a logical structure, like an Active Directory group, because this makes it efficient to assign a group to users and an access entitlement to a group, versus assigning the underlying access entitlement individually to each user. Effective access also usually allows inheritance of access entitlements based on nested associations of groups. In other words, if a user is associated with a first group that is a subgroup of a second group, the user may indirectly (or effectively) be assigned the access entitlements assigned to both the second group and the first group. Thus, effective access can be multiple levels deep with complex inheritance structures.

As part of a robust identity management system, it is thus desirable to offer the capability for the storage of detailed and relevant contextual identity governance information for an enterprise. Specifically, it is desirable to maintain the hierarchical structure of source systems with respect to the modeling of entitlements and identities in an IM system. From a technical perspective, however, it is undesirable to directly mirror or ape the model of hierarchical structures of the source system themselves, as these structures are not universal across source systems and reliance on such proprietary models may lead to a dependency on a single model or, conversely, the need to implement a data model for each source system from which these identities and entitlements are obtained or derived. Embodiments of an identity management system as disclosed herein may thus utilize embodiments of a data model that associated identities with their respective entitlements, while preserving the hierarchy imposed by the source system from which those identities or entitlement were derived, including the hierarchical structure that resulted in the (direct or effective) assignment of such an entitlement along with the hierarchical nature of the digital assets to which those entitlements pertain.

In particular, as connectors 156 of the identity management system 150 request or otherwise obtain data from various touchpoint (or source) systems within enterprise environment 100 to obtain identity management data 154 or subsequently thereto, as data is obtained from certain source systems (e.g., Active Directory) a process may evaluate the data on the identity management artifacts or related digital assets (e.g., such as an identity, entitlement, role, group, access profile, digital asset or account) to determine entitlements for those source systems assigned to an identity, including both those entitlements that are directly assigned to an identity and those that are effectively assigned to the identity. This evaluation or determination can be accomplished by evaluating the management structures of the source system, determining the entitlements associated with those management structures and the users assigned to those management structures. The evaluation or determination can be an iterative or recursive process such that any nested management structures and associated entitlements may also be determined. Additionally, it can be determined from the data obtained from the source system how such entitlements were assigned to the user (e.g., what, if any, intermediary artifacts or management constructs such as groups through which the identity was granted an entitlement).

The hierarchy of the digital assets (e.g., and managed or created by the source system) associated with those entitlements may also be obtained from the source system. Again, the determination of the hierarchy of digital assets can be recursive such that the hierarchical relationships between the digital assets may be determined regardless of any levels of nesting of these digital assets. The identity and entitlements can then be associated at the identity management system 150 in an embodiment of a data model where the identity is associated with its respective entitlements and the hierarchy imposed by the source system from which those identities or entitlement were derived (including the hierarchical structure that resulted in the (direct or effective) assignment of such an entitlement) is preserved, along with the hierarchical nature of the digital assets to which those entitlements pertain.

Embodiments of the identity management system 150 can store identity management data 154 according to this model in identity management data store 155. The identity management data 154 stored may include a set entries, each entry corresponding to an identity management artifact as discussed. For example, the identity management data 154 may include entries on an identity (e.g., alphanumerical identifiers for identities) as defined and managed by the identity management system and a list or vector of entitlements and groups assigned to that identity by the identity management system (e.g., as determined by the identity management system 150 from the data obtained from the source system). In one embodiment, the identity management data 154 for artifacts (e.g., an identity) can be stored in an Identity Cube where all identity management data 154 associated with the particular artifact (e.g., for an identity all of their accounts from all data sources, and all attributes and entitlements of those accounts) may be associated.

Thus, embodiments of identity management data 154 may comprise the Identity Cube for an identity linked or otherwise associated with a set of entitlements (e.g., the Identity Cube may include one or more alphanumerical identifiers for each associated entitlement, where each entitlement may also be an entry in the identity management data 154. For each of the entitlements in the identity management data 154, the entitlement may store an identifier of a resource (e.g., digital asset) to which that entitlement pertains. In other words, the entitlement may be an access right for the identified resource (e.g., digital resource). The link between the entitlement and the associated resource may be an identifier of an entry in the identity management data 154 for the resource, or may comprise a field or attribute identifying the associated resource. Thus, embodiments of the data model may maintain entitlements assigned directly to an identity, regardless of whether those entitlements are granted to an identity directly or effectively.

Moreover, embodiments of the data model utilized for identity management data 154 may maintain hierarchy links or pointers. These embodiments may preserve the hierarchy among the resources relating to the entitlements themselves by maintaining pointers between the entitlements that reflect the hierarchy (e.g., parent or child relationships) of the related digital assets corresponding to those entitlements. Specifically, in one embodiment, each of the entitlements, or a resource associated with a particular entitlement, may include one or more hierarchy links (or pointers, used herein interchangeably). The hierarchy links may associate the resource (e.g., of the entitlement) with an entitlement to a resource (or the resource itself) with which it is associated in a hierarchy maintained by the source system, or an entitlement (or resource) from which the entitlement to the resource of the instant entitlement was derived. Thus, for example, if the entitlement is access to a particular resource that is a folder, that entitlement (or resource representing that folder) may have a hierarchy link to an entitlement representing an access to a parent folder (or the parent folder itself). As another example, if the entitlement is a particular permission for a particular application, that entitlement (or resource representing that permission) may have a hierarchy link to an entitlement for the application itself (or a resource representing the application to which that permission pertains). The hierarchy links between entitlements (or entitlements and resources) may be stored in an entry in identity management data 154 corresponding to an entitlement. For example, an entry for entitlement may have a vector or attribute that may include any identifiers for any parent entitlements (or resources) or may have a vector or attribute that may include any identifiers for any child entitlements in a hierarchy.

Additionally, embodiments of the data model may preserve any hierarchical structure from which effective entitlements are derived by maintaining effective access attributes on each effective entitlement, where an inheritance attribute on an entitlement can specify one or more intermediary identity management constructs or other management constructs (e.g., a group) maintained by the source system through which the entitlement having that effective access attribute was effectively assigned. In this manner, the effective access attributes may model the "how" of the entitlement, in other words the effective access attributes may reflect the identity management artifacts (including, in some embodiment, the path or hierarchy of these artifacts) of a source system that resulted in the identity being granted the entitlement (e.g., a group or the like). In such embodiments, it may not be needed or desired to represent such management structures or objects in the identity management data 154 directly. Instead, such management structures may instead be represented through their assignment through an inheritance attribute.

The effective access attribute between an entitlement and an identity management construct may be stored in an entry in identity management data 154 corresponding to an entitlement. For example, an entry for an entitlement in identity management data 154 may have a vector or attribute that may include any identifiers for any identity management constructs through which the entitlement was effectively assigned or may have a vector or attribute that may include any identifiers for any such intermediary identity management constructs (e.g., an alphanumerical identifier for a group or the like).

Using such a data model for in identity management data 154 then, embodiments of IM systems may implement tasks, processes or policies that take advantage of the ability to easily navigate between an identity and its respective entitlements, the identity management artifacts that resulted in the entitlement being assigned or the hierarchical relationships between the digital assets corresponding to those entitlements. In this way, increasingly complex tasks, processes and policies may be defined and implemented in an IM system. Specifically, for example, SOD policies that take into account the artifacts and the associated assignment of entitlements (including both direct and effective access) and the hierarchical relationships between digital assets may now be created, evaluated and enforced as will be illustrated in more detail herein.

Figure 2A:
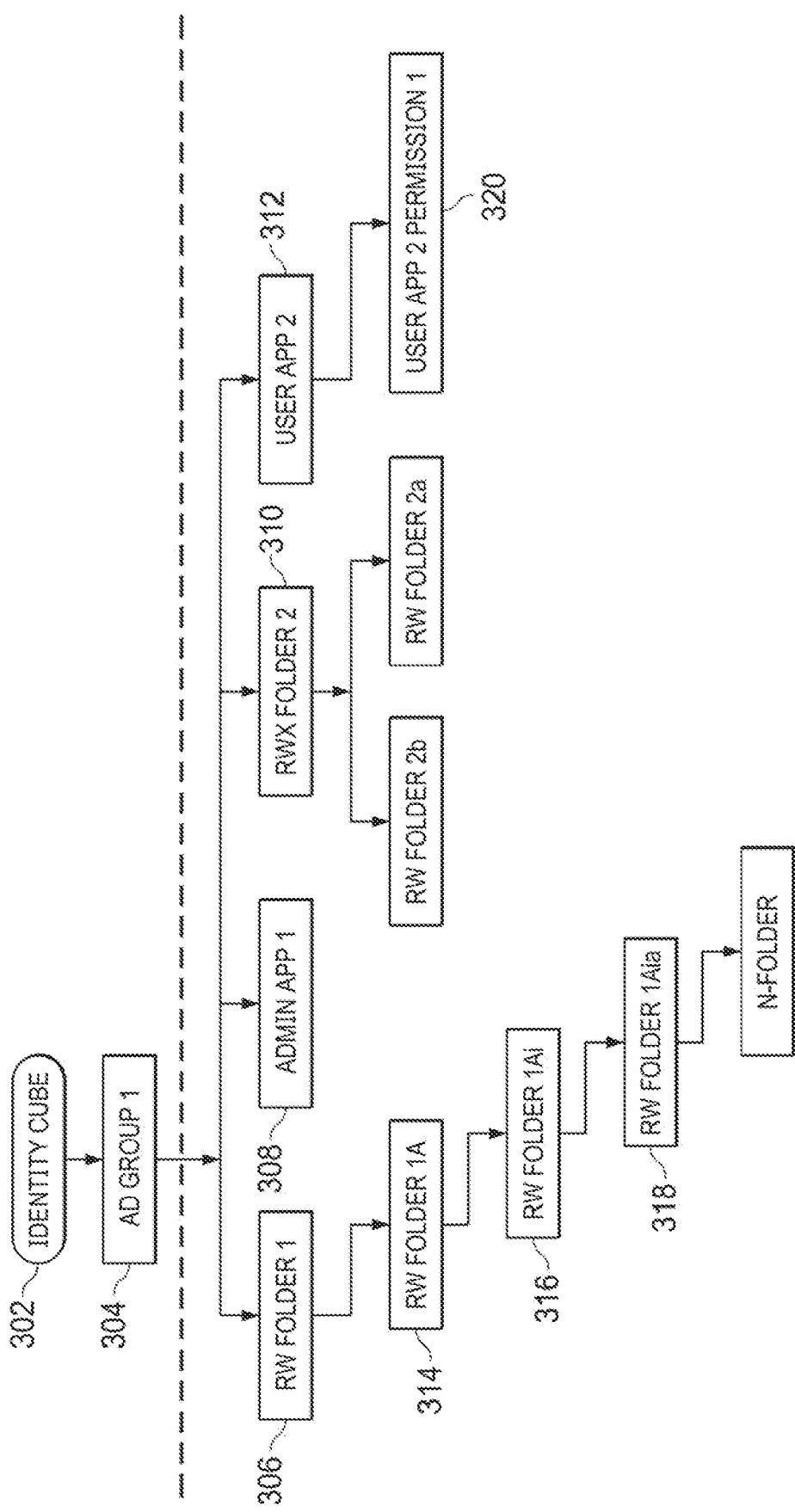
FIG. 2A is a block diagram of an example of identity management data stored in a data model.

First, however, it may now be useful to graphically illustrate embodiments of such data models. Referring then to FIG. 2A, one example of a particular manner of modeling access in an identity management system is depicted. Here, a user represented by identity cube 302 has been assigned to Active Directory (AD) "Group 1" as represented by entitlement 304. As can be seen, the user in this example has been directly assigned to AD "Group 1", but inherits the access that is assigned to AD "Group 1" via indirect access. As may be recalled, indirect or effective access is access that may be assigned to another management structure or object that is inherited by an identity by virtue of that identity's assignment to that management structure.

In this example, all entitlements below the dashed line in FIG. 2A are inherited by the user represented by identity cube 302 though that user's assignment to AD "Group 1". Accordingly, by virtue of the user's assignment to "Group 1" in the AD source system, the user has been granted effective (or indirect) access or entitlements to certain resources, including Read Write (RW) access to "Folder 1" (represented by entitlement 306), Admin access to "App 1" (represented by entitlement 308), Read Write Delete (RWX) access to "Folder 2" (represented by entitlement 310) and access to "User App 2" (represented by entitlement 312). Moreover, by virtue of the user's effective access to these resources, the user has been granted access entitlements to certain resources that have a hierarchical relationship with those resources. For example, as the user has been granted (effective) (RW) access to "Folder 1" (represented by entitlement 306) the user has also been granted Read Write (RW) access to "Folder 1A" (represented by entitlement 314) and its subfolders for example, "Folder 1Ai" (represented by entitlement 316), "Folder 1Aia" (represented by entitlement 318), and any other subfolders. Similarly, as the user has been granted (effective) access to "User App 2" (represented by entitlement 312) the user has also been granted "Permission 1" to "User App 2" (represented by entitlement 320).

Figure 2B:
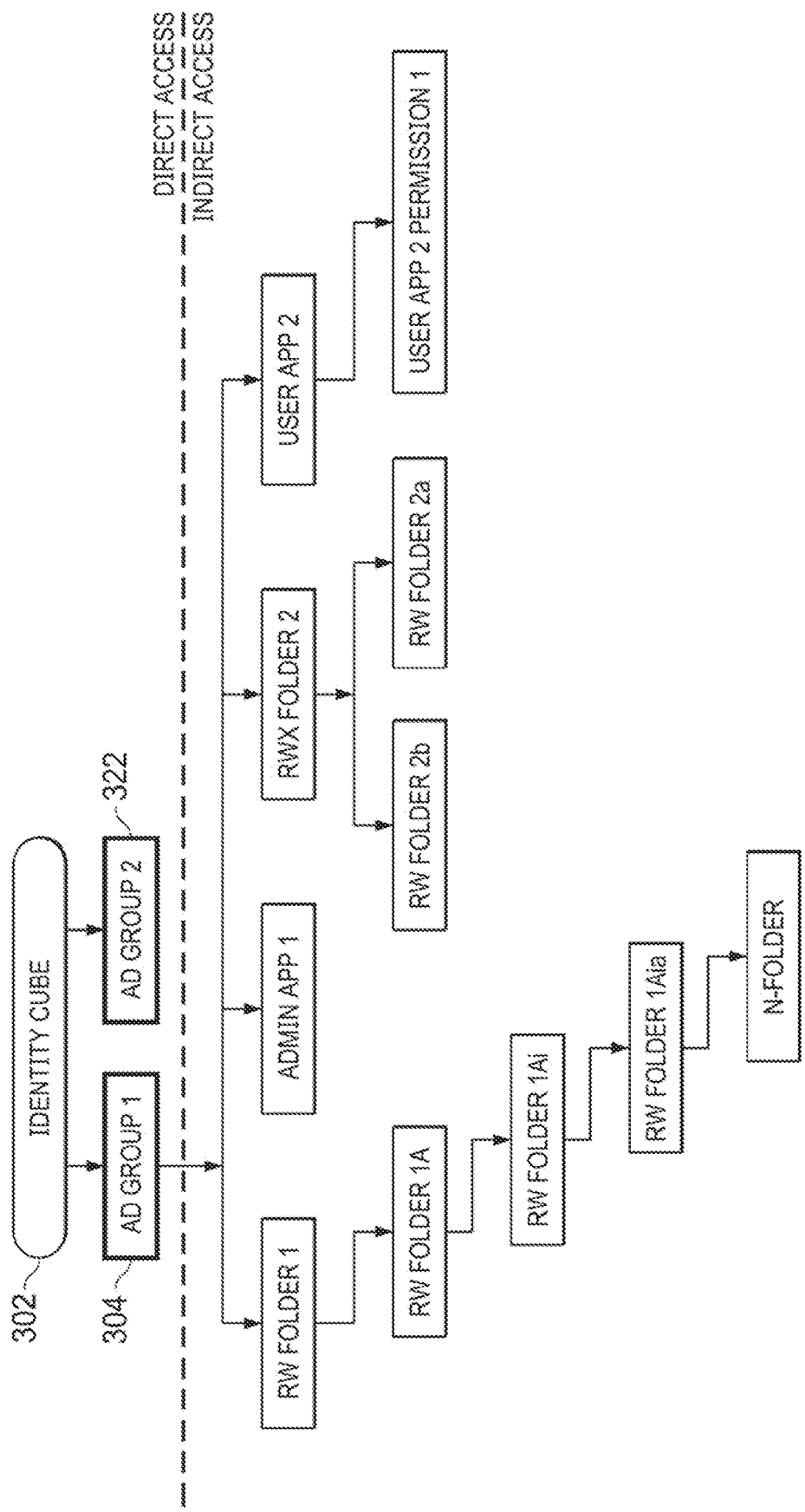
FIG. 2B is a block diagram of an example of applying an SOD policy to identity management data stored in a data model.

Notice, however, that as these entitlements, 306, 308, 310, 312, 314, 316, 318, etc. that have been effectively granted to the user are not directly assigned to the identity cube 302 any navigation of these entitlements 306, 308, 310, 312, 314, 316, 318 (e.g., to implement or evaluate tasks, processes or policies, such as SOD policies), requires navigation of each of the branches of the tree or graph structure to evaluate any two entitlements in association with another. Thus, the complexity of evaluating any two chosen entitlements in association with one another may grow exponentially in relation to the number of entitlements associated with the identity cube 302. In fact, looking at FIG. 2B, it may be the case in many instances that when entitlements are represented in a data model confined to the representation as depicted in FIG. 2A, certain tasks, processes and policies may only be evaluated or applied across access granted directly to the user. As shown in FIG. 2B for example, an SOD policy may only be able to account for, or applied to, access granted directly to the user (represented by identity cube 302), including access granted the user to AD "Group 1" (represented by entitlement 304) and access granted the user to AD "Group 2" (represented by entitlement 322). Such an SOD may not be able to be applied to any of the access entitlements granted to the user indirectly, or may only be applied in an extremely inefficient, slow and memory and processor intensive manner.

Figure 3A:
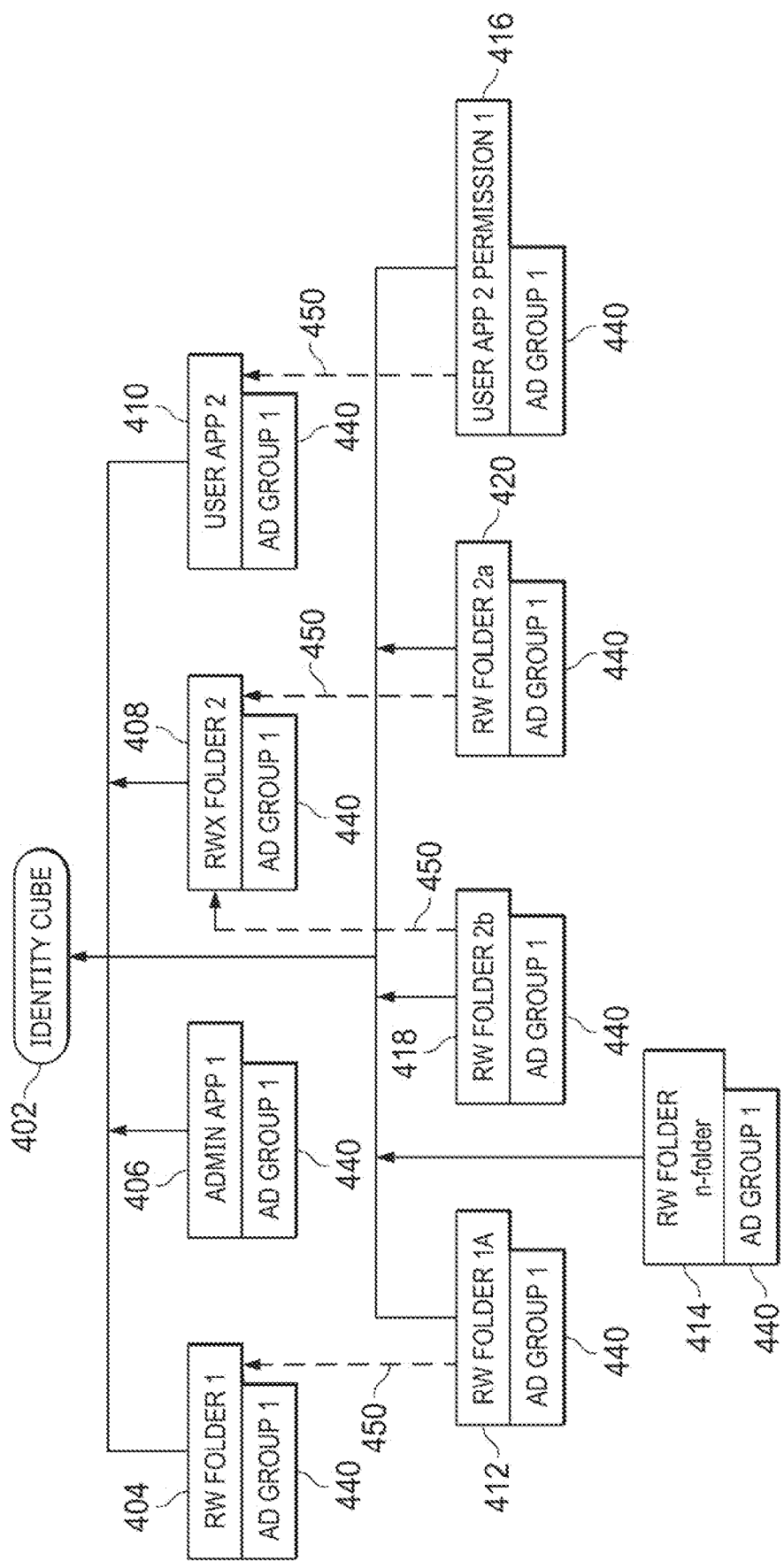
FIG. 3A is a block diagram of an example of identity management data stored in one embodiment of a data model.

Moving now to FIG. 3A, an example of the application of an embodiment of a data model that represents all access entitlements assigned to a user (e.g., directly or effectively) as directly assigned to the user while preserving both the hierarchy among the resources relating to the entitlements themselves and any hierarchical structure from which effective entitlements are derived is depicted. These embodiments may pivot the data model, now representing effective access directly on the identity cube while maintaining access hierarchy relationships. Here, for example a user represented by identity cube 402 has been directly assigned to Active Directory (AD) "Group 1". Through the user's assignment to Active Directory (AD) "Group 1", the user in this example has been assigned Read Write (RW) access to "Folder 1" (represented by entitlement 404), Admin access to "App 1" (represented by entitlement 406), Read Write Delete (RWX) access to "Folder 2" (represented by entitlement 408) and access to "User App 2" (represented by entitlement 410).

Moreover, by virtue of the user's effective access to these resources, the user has been granted access entitlements to certain resources that have a hierarchical relationship with those resources. For example, as the user has been granted (effective) (RW) access to "Folder 1" (represented by entitlement 404) the user has also been granted Read Write (RW) access to "Folder 1A" (represented by entitlement 412) and its subfolders for example, "Folder n" (represented by entitlement 414), a subfolder of "Folder 1A". Similarly, as the user has been granted (effective) access to "User App 2" (represented by entitlement 408) the user has also been granted "Permission 1" to "User App 2" (represented by entitlement 416) and as the user has been granted (effective) access to RWX) access to "Folder 2" (represented by entitlement 408) the user has also been granted RW access to "Folder 2b" (represented by entitlement 418) and RW access to "Folder 2b" (represented by entitlement 420).

In contrast with the data model utilized in FIGS. 2A and 2B, however, here, each entitlement 404, 406, 408, 410, 412, 414, 416, 418, 420 is linked directly to the identity cube 402 representing the user. In this manner, each entitlement 404, 406, 408, 410, 412, 414, 416, 418, 420 may be accessed or ascertained directly from the identity cube 402 for the user by accessing the data model. The data model may also preserve the hierarchical structure from which effective entitlements are derived by maintaining effective access attributes on each effective entitlement, where an inheritance attribute on an entitlement can specify one or more intermediary identity management constructs (e.g., a group) maintained by the source system through which the entitlement having that effective access attribute was effectively assigned. Here, for example, as each of the entitlements 404, 406, 408, 410, 412, 414, 416, 418, 420 was effectively assigned to the user (represented by identity cube 402) each of these entitlements 404, 406, 408, 410, 412, 414, 416, 418, 420 may have an inheritance attribute 440 of the entitlement 404, 406, 408, 410, 412, 414, 416, 418, 420 the has the value "Group 1" or otherwise denotes that AD "Group 1" management object. In this manner, the effective access or inheritance attribute 440 may model the "how" of the entitlement. In other words the effective access attribute 440 may reflect the management object (including, in some embodiment, the path or hierarchy of these artifacts) of a source system that resulted in the identity being granted the entitlement.

Embodiments of the data model may also preserve the hierarchy among the resources relating to the entitlements themselves by maintaining hierarchy links 450 between the entitlements that reflect the hierarchy (e.g., parent or child relationships) of the related digital assets corresponding to those entitlements. Here, for example, as "Folder 1" (represented by entitlement 404) is a parent folder of "Folder 1A" (represented by entitlement 412), hierarchy link 450 of entitlement 412 may point to or otherwise reference entitlement 404 to associate the resource ("Folder 1A") of entitlement 412 with an entitlement 404 to a resource ("Folder 1") with which it is associated in a hierarchy maintained by the source system, or an entitlement 404 (or resource) from which the entitlement to the resource of entitlement 412 was derived.

As another example, as "Folder 2" (represented by entitlement 408) is a parent folder of both "Folder 2a" (represented by entitlement 420) and "Folder 2b" (represented by entitlement 418), hierarchy link 450 of entitlement 418 may reference entitlement 408 and hierarchy link 450 of entitlement 420 may reference entitlement 408. In this manner, both the resource ("Folder 2b") of entitlement 418 and the resource ("Folder 2a") of entitlement 420 are associated with an entitlement 408 to a resource ("Folder 2") with which they are associated in a hierarchy maintained by the source system, or an entitlement 408 (or resource) from which the entitlement to the resource of the instant entitlement 418, 420 was derived.

As yet another example, as "Permission 1" to "User App 2" (represented by entitlement 416) is part of "User App 2" (represented by entitlement 410), hierarchy link 450 of entitlement 4416 may point to or otherwise reference entitlement 410 to associate the resource ("Permission 1" to "User App 2") of entitlement 416 with an entitlement 410 to a resource ("User App 2") with which it is associated in a hierarchy maintained by the source system, or an entitlement 410 (or resource) from which the entitlement to the resource of entitlement 416 was derived.

Figure 3B:
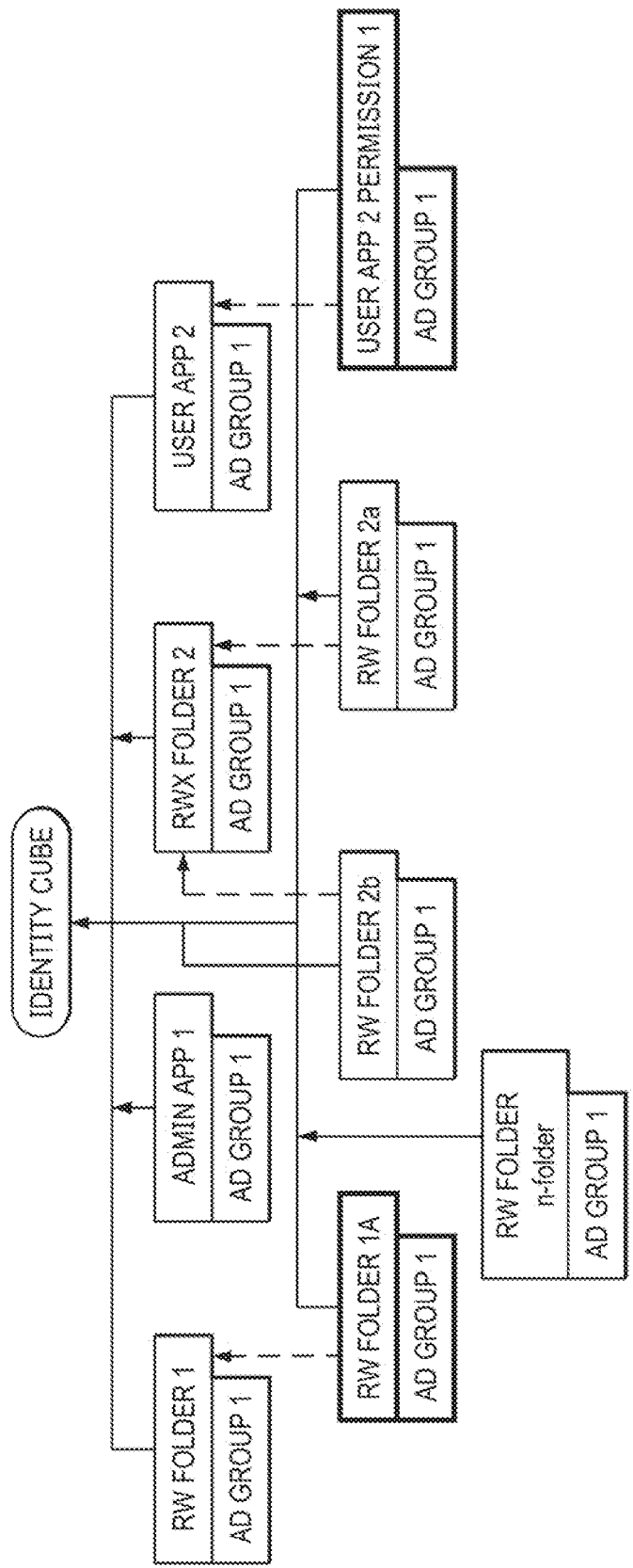
FIG. 3B is a block diagram of an example of applying an SOD policy to identity management data stored in an embodiment of a data model.

Using embodiments of such a data model to model entitlements derived from a source system in an identity management system may have a number of advantages. For example, SOD policies may define one or more entitlements that may not be granted together, must be granted in tandem, that may or may not be granted to an identity with certain attributes or other conditions for the granting of one or entitlements. Using embodiments of a data model such as that depicted herein that model effective access directly on the identity while preserving the hierarchical structure of access assignment and resource structure, identity management systems may evaluate and perform SOD analysis on complex access structures, regardless of where in the hierarchy the access entitlement exists. So for example, with reference to FIG. 3B, even though "Permission 1" to "User App 2" (represented by entitlement 416) and Read Write (RW) access to "Folder 1A" (represented by entitlement 412) are not derived from, or associated with, the same resource, a SOD policy that references both these entitlements can be easily evaluated, as both these entitlements are associated directly with the identity cube 402, and it can be determined from each of these entitlements 412, 416 that they were both inherited from the user's assignment to AD "Group 1".

Embodiments may be further understood with reference to the following eXtensible Markup Language (XML) definitions of an SOD policy, the first being an SOD policy that can only be evaluated for access that is directly assigned to a user and the second being an SOD policy that may be used for effective access evaluation and includes related attributes.

```
<?xml version='1.0' encoding='UTF-8'?>
<!DOCTYPE Policy PUBLIC "sailpoint.dtd" "sailpoint.dtd">
<Policy certificationActions="Remediated,Mitigated,Delegated"
configPage="entitlementPolicy.xhtml" created="1563787974573"
executor="sailpoint.policy.EntitlementSODPolicyExecutor"
id="ac10042c6c191612816c1906d7ad044e" modified="1563787976832"
name="Entitlement Policy" state="Active" type="EntitlementSOD"
typeKey="policy_type_entitlement_sod" violationOwnerType="Manager">
    <PolicyAlert escalationStyle="none"/>
    <Attributes>
        <Map>
            <entry key="sysDescriptions">
                <value>
                    <Map>
                        <entry key="en_US" value="Constraints defined at the entitlement level,
including uncorrelated permissions and attributes."/>
                    </Map>
                </value>
            </entry>
            <entry key="violationRule"/>
        </Map>
    </Attributes>
    <Owner>
        <Reference class="sailpoint.object.Identity"
id="ac10042c6c191612816c19065c3000e3" name="spadmin"/>
    </Owner>
    <GenericConstraints>
        <GenericConstraint created="1563787974574"
id="ac10042c6c191612816c1906d7ae044f" name="Customer billing and vendor
records" violationOwnerType="None">
            <Attributes>
                <Map>
                    <entry key="violationRule"/>
                </Map>
            </Attributes>
            <CompensatingControl>Pricing management and upper-level customer support may
require exceptions in this case.</CompensatingControl>
            <Description>Vendor management should not be able to update customer billing
information. Customer access to vendors can be hidden.</Description>
```

-continued

```
        <RemediationAdvice>Access to creation and modification to customer billing records
should be examined.</RemediationAdvice>
        <IdentitySelector>
          <MatchExpression>
            <MatchTerm name="Cstmr Billing" permission="true" value="create">
              <ApplicationRef>
                <Reference class="sailpoint.object.Application"
id="ac10042c6c191612816c1906bd60033c" name="Oracle_DB_oasis"/>
              </ApplicationRef>
            </MatchTerm>
            <MatchTerm name="Cstmr Billing" permission="true" value="update">
              <ApplicationRef>
                <Reference class="sailpoint.object.Application"
id="ac10042c6c191612816c1906bd60033c" name="Oracle_DB_oasis"/>
              </ApplicationRef>
            </MatchTerm>
          </MatchExpression>
        </IdentitySelector>
        <IdentitySelector>
          <MatchExpression>
            <MatchTerm name="groupmbr" value="VendorCare">
              <ApplicationRef>
                <Reference class="sailpoint.object.Application"
id="ac10042c6c191612816c1906bc100337" name="Active_Directory"/>
              </ApplicationRef>
            </MatchTerm>
          </MatchExpression>
        </IdentitySelector>
      </GenericConstraint>
      <GenericConstraint created="1563787974576"
id="ac10042c6c191612816c1906d7b00450" name="Remote access and data export
capability" violationOwnerType="None">
        <Attributes>
          <Map>
            <entry key="violationRule"/>
          </Map>
        </Attributes>
        <CompensatingControl>The ability to export data remotely should only be granted
temporarily.</CompensatingControl>
        <Description>Remote access should not include data export
functionality.</Description>
        <RemediationAdvice>Export should not be allowed if user has remote
access.</RemediationAdvice>
        <IdentitySelector>
          <MatchExpression>
            <MatchTerm name="groupmbr" value="Remote">
              <ApplicationRef>
                <Reference class="sailpoint.object.Application"
id="ac10042c6c191612816c1906bc100337" name="Active_Directory"/>
              </ApplicationRef>
            </MatchTerm>
          </MatchExpression>
        </IdentitySelector>
        <IdentitySelector>
          <MatchExpression>
            <MatchTerm name="Allow Export" permission="true" value="create">
              <ApplicationRef>
                <Reference class="sailpoint.object.Application"
id="ac10042c6c191612816c1906bd60033c" name="Oracle_DB_oasis"/>
              </ApplicationRef>
            </MatchTerm>
            <MatchTerm name="Allow Export" permission="true" value="execute">
              <ApplicationRef>
                <Reference class="sailpoint.object.Application"
id="ac10042c6c191612816c1906bd60033c" name="Oracle_DB_oasis"/>
              </ApplicationRef>
            </MatchTerm>
          </MatchExpression>
        </IdentitySelector>
      </GenericConstraint>
      <GenericConstraint created="1563787974578"
id="ac10042c6c191612816c1906d7b20451" name="Data Archive access and audit
modification" violationOwnerType="None">
        <Attributes>
          <Map>
            <entry key="violationRule"/>
          </Map>
        </Attributes>
        <CompensatingControl>None.</CompensatingControl>
```

-continued

```
        <Description>People with access to the Data Archive should not be able to modify
the auditArchive. This is a restriction of Operations code 217g.</Description>
        <RemediationAdvice>Remove any delete or update permissions on the
auditArchive.</RemediationAdvice>
        <IdentitySelector>
            <MatchExpression>
                <MatchTerm name="Audit Archive" permission="true" value="delete">
                    <ApplicationRef>
                        <Reference class="sailpoint.object.Application"
id="ac10042c6c191612816c1906bd60033c" name="Oracle_DB_oasis"/>
                    </ApplicationRef>
                </MatchTerm>
                <MatchTerm name="Audit Archive" permission="true" value="update">
                    <ApplicationRef>
                        <Reference class="sailpoint.object.Application"
id="ac10042c6c191612816c1906bd60033c" name="Oracle_DB_oasis"/>
                    </ApplicationRef>
                </MatchTerm>
            </MatchExpression>
        </IdentitySelector>
        <IdentitySelector>
            <MatchExpression>
                <MatchTerm name="groupmbr" value="DataArchive">
                    <ApplicationRef>
                        <Reference class="sailpoint.object.Application"
id="ac10042c6c191612816c1906bc100337" name="Active_Directory"/>
                    </ApplicationRef>
                </MatchTerm>
                <MatchTerm name="groupmbr" value="Buyer">
                    <ApplicationRef>
                        <Reference class="sailpoint.object.Application"
id="ac10042c6c191612816c1906bc100337" name="Active_Directory"/>
                    </ApplicationRef>
                </MatchTerm>
            </MatchExpression>
        </IdentitySelector>
    </GenericConstraint>
    <GenericConstraint created="1563787974580"
id="ac10042c6c191612816c1906d7b40452" name="Customer billing and protected
procurement" violationOwnerType="None">
        <Attributes>
            <Map>
                <entry key="violationRule"/>
            </Map>
        </Attributes>
        <CompensatingControl>Check with managers for approval.</CompensatingControl>
        <Description>Users with Customer billing update access should not have access to
the protected procurement groups</Description>
        <RemediationAdvice>Remove the procurement groups pending manager
approval.</RemediationAdvice>
        <IdentitySelector>
            <MatchExpression>
                <MatchTerm name="groups" value="ACD80128">
                    <ApplicationRef>
                        <Reference class="sailpoint.object.Application"
id="ac10042c6c191612816c1906c4ec0350" name="Procurement_System"/>
                    </ApplicationRef>
                </MatchTerm>
                <MatchTerm name="groups" value="ACD80154">
                    <ApplicationRef>
                        <Reference class="sailpoint.object.Application"
id="ac10042c6c191612816c1906c4ec0350" name="Procurement_System"/>
                    </ApplicationRef>
                </MatchTerm>
            </MatchExpression>
        </IdentitySelector>
        <IdentitySelector>
            <MatchExpression>
                <MatchTerm name="Cstmr Billing" permission="true" value="create">
                    <ApplicationRef>
                        <Reference class="sailpoint.object.Application"
id="ac10042c6c191612816c1906bd60033c" name="Oracle_DB_oasis"/>
                    </ApplicationRef>
                </MatchTerm>
                <MatchTerm name="Cstmr Billing" permission="true" value="update">
                    <ApplicationRef>
                        <Reference class="sailpoint.object.Application"
id="ac10042c6c191612816c1906bd60033c" name="Oracle_DB_oasis"/>
                    </ApplicationRef>
```

```
        </MatchTerm>
      </MatchExpression>
    </IdentitySelector>
  </GenericConstraint>
</GenericConstraints>
</Policy>
<Policy certificationActions="Remediated,Mitigated,Delegated"
configPage="entitlementPolicy.xhtml"
executor="sailpoint.policy.EffectiveEntitlementSODPolicyExecutor" name="Effective
Entitlements SOD example" state="Active" type="EffectiveEntitlementSOD"
typeKey="policy_type_effective_entitlement_sod" violationOwnerType="Manager">
    <PolicyAlert disabled="true" escalationStyle="none"/><Attributes><Map><entry
    key="sysDescriptions"><value><Map><entry key="en_US" value="PAM Effective
    Access Rule"/></Map></value></entry><entry key="violationRule" value="Policy
    Formatting - Number of resources with
    score"/></Map></Attributes><Owner><Reference class="sailpoint.object.Identity"
    name="Adam.Kennedy"/></Owner><GenericConstraints><GenericConstraint
    name=" Effective SOD Rule" violationOwnerType="None"><Description>can't have
    create object on container 1 and container
    2</Description><IdentitySelector><MatchExpression><MatchTerm
    checkEffective="true" name="container1" type="TargetPermission" value="Create
    Object"><TargetSourceRef><Reference class="sailpoint.object.TargetSource"
    name="PAMTargetSource"/></TargetSourceRef></MatchTerm></MatchExpression>
    </IdentitySelector><IdentitySelector><MatchExpression><MatchTerm
    checkEffective="true" name="container2" type="TargetPermission" value="Create
    Object"><TargetSourceRef><Reference class="sailpoint.object.TargetSource"
    name="PAMTargetSource"/></TargetSourceRef></MatchTerm></MatchExpression>
    </IdentitySelector></GenericConstraint></GenericConstraints></Policy>
```

Those skilled in the relevant art will appreciate that the invention can be implemented or practiced with other computer system configurations including, without limitation, multi-processor systems, network devices, mini-computers, mainframe computers, data processors, and the like. Embodiments can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

Although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a set of distributed computers communicatively coupled to a network (for example, the Internet). Any suitable programming language can be used to implement the routines, methods or programs of embodiments of the invention described herein, including R, Python, C, C++, Java, JavaScript, HTML, or any other programming or scripting code, etc. Other software/hardware/network architectures may be used. Communications between computers implementing embodiments can be accomplished using any electronic, optical, radio frequency signals, or other suitable methods and tools of communication in compliance with known network protocols.

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

What is claimed is:

1. An identity management system, comprising:
   a processor;
   a non-transitory computer-readable storage medium, including computer instructions for:
   obtaining a separation of duties policy; and
   evaluating the separation of duties policy against a particular user using an identity management data structure at the identity management system, the identity management data structure representing the particular user, a first entitlement for a first digital asset within a distributed enterprise computing environment, and a second digital asset within the distributed enterprise computing environment, wherein the first entitlement is directly assigned to the particular user and the second entitlement is indirectly assigned to the particular user through a first management structure maintained by a source system whereby the particular user is granted the second entitlement by virtue of the particular user's assignment to the first management structure by the source system,
   wherein:
   the identity management data structure represents the particular user, the first entitlement, and the second entitlement such that the first entitlement for the first digital asset and the second entitlement for the second digital asset are a single level removed from the identity management data structure representing the particular user,
   the first entitlement for the first digital asset is directly linked to the identity management data structure representing the particular user, wherein the first entitlement for the first digital asset is assigned to the particular user,
   the second entitlement for the second digital asset is directly linked to the identity management data structure representing the particular user, wherein the second entitlement for the second digital asset is assigned to the particular user, and
   the second entitlement includes a first inheritance attribute, wherein the value of the first inheritance attribute is an identifier of the first management structure maintained by the source system to which the particular user is assigned by the source system and through which the particular user is granted the second entitlement to the second digital asset.

2. The identity management system of claim 1, wherein the instructions are further for allowing or denying the particular user a third digital asset identified in the separation of duties policy based on the evaluation of the separation of duties policy.

3. The identity management system of claim 2, wherein the third digital asset is the first digital asset or the second digital asset.

4. The identity management system of claim 2, wherein the third digital asset is a third entitlement.

5. The identity management system of claim 1, wherein the evaluation of the separation of duties policy comprises applying the separation of duties policy to the representation of the first entitlement in the identity management data structure and the representation of the second entitlement in the identity management data structure.

6. The identity management system of claim 1, wherein the identity management data structure includes a hierarchical link linking a third entitlement for a third digital asset to the second entitlement and indicating the third digital asset is a child of the second digital asset.

7. The identity management system of claim 6, wherein the third entitlement includes a second inheritance attribute, wherein the value of the second inheritance attribute is the identifier of the first management structure maintained by the source system to which the particular user is assigned by the source system and through which the particular user is granted the second entitlement to the second digital asset.

8. A non-transitory computer-readable storage medium, including computer instructions for:
obtaining a separation of duties policy; and
evaluating the separation of duties policy against a particular user using an identity management data structure at the identity management system, the identity management data structure representing the particular user, a first entitlement for a first digital asset within a distributed enterprise computing environment, and a second digital asset within the distributed enterprise computing environment, wherein the first entitlement is directly assigned to the particular user and the second entitlement is indirectly assigned to the particular user through a first management structure maintained by a source system whereby the particular user is granted the second entitlement by virtue of the particular user's assignment to the first management structure by the source system,
wherein:
the identity management data structure represents the particular user, the first entitlement, and the second entitlement such that the first entitlement for the first digital asset and the second entitlement for the second digital asset are a single level removed from the identity management data structure representing the user,
the first entitlement for the first digital asset is directly linked to the identity management data structure representing the particular user, wherein the first entitlement for the first digital asset is assigned to the particular user,
the second entitlement for the second digital asset is directly linked to the identity management data structure representing the particular user, wherein the second entitlement for the second digital asset is assigned to the particular user, and
the second entitlement includes a first inheritance attribute, wherein the value of the first inheritance attribute is an identifier of the first management structure maintained by the source system to which the particular user is assigned by the source system and through which the particular user is granted the second entitlement to the second digital asset.

9. The non-transitory computer-readable storage medium of claim 8, wherein the instructions are further for allowing or denying the particular user a third digital asset identified in the separation of duties policy based on the evaluation of the separation of duties policy.

10. The non-transitory computer-readable storage medium of claim 9, wherein the third digital asset is the first digital asset or the second digital asset.

11. The non-transitory computer-readable storage medium of claim 9, wherein the third digital asset is a third entitlement.

12. The non-transitory computer-readable storage medium of claim 8, wherein the evaluation of the separation of duties policy comprises applying the separation of duties policy to the representation of the first entitlement in the identity management data structure and the representation of the second entitlement in the identity management data structure.

13. The non-transitory computer-readable storage medium of claim 8, wherein the identity management data structure includes a hierarchical link linking a third entitlement for a third digital asset to the second entitlement and indicating the third digital asset is a child of the second digital asset.

14. The non-transitory computer-readable storage medium of claim 8, wherein the third entitlement includes a second inheritance attribute, wherein the value of the second inheritance attribute is the identifier of the first management structure maintained by the source system to which the particular user is assigned by the source system and through which the particular user is granted the second entitlement to the second digital asset.

15. A method, comprising:
obtaining a separation of duties policy; and
evaluating the separation of duties policy against a particular user using an identity management data structure at the identity management system, the identity management data structure representing the particular user, a first entitlement for a first digital asset within a distributed enterprise computing environment, and a second digital asset within the distributed enterprise computing environment, wherein the first entitlement is directly assigned to the particular user and the second entitlement is indirectly assigned to the particular user through a first management structure maintained by a source system whereby the particular user is granted the second entitlement by virtue of the particular user's assignment to the first management structure by the source system,
wherein:
the identity management data structure represents the particular user, the first entitlement, and the second entitlement such that the first entitlement for the first digital asset and the second entitlement for the second digital asset are a single level removed from the identity management data structure representing the particular user,
the first entitlement for the first digital asset is directly linked to the identity management data structure representing the particular user, wherein the first entitlement for the first digital asset is assigned to the particular user,
the second entitlement for the second digital asset is directly linked to the identity management data structure representing the particular user, wherein the second entitlement for the second digital asset is assigned to the particular user, and the second entitlement includes a first inheritance attribute, wherein the value of the first inheritance attribute is an identifier of the first management structure maintained by the source system to which the particular user is assigned by the source system and through which the particular user is granted the second entitlement to the second digital asset.

16. The method of claim 15, further comprising allowing or denying the particular user a third digital asset identified in the separation of duties policy based on the evaluation of the separation of duties policy.

17. The method of claim 16, wherein the third digital asset is the first digital asset or the second digital asset.

18. The method of claim 16, wherein the third digital asset is a third entitlement.

19. The method of claim 15, wherein the evaluation of the separation of duties policy comprises applying the separation of duties policy to the representation of the first entitlement in the identity management data structure and the representation of the second entitlement in the identity management data structure.

20. The method of claim 15, wherein the identity management data structure includes a hierarchical link linking a third entitlement for a third digital asset to the second entitlement and indicating the third digital asset is a child of the second digital asset.

21. The method of claim 15, wherein the third entitlement includes a second inheritance attribute, wherein the value of the second inheritance attribute is the identifier of the first management structure maintained by the source system to which the particular user is assigned by the source system and through which the particular user is granted the second entitlement to the second digital asset.

* * * * *